UNITED STATES PATENT OFFICE.

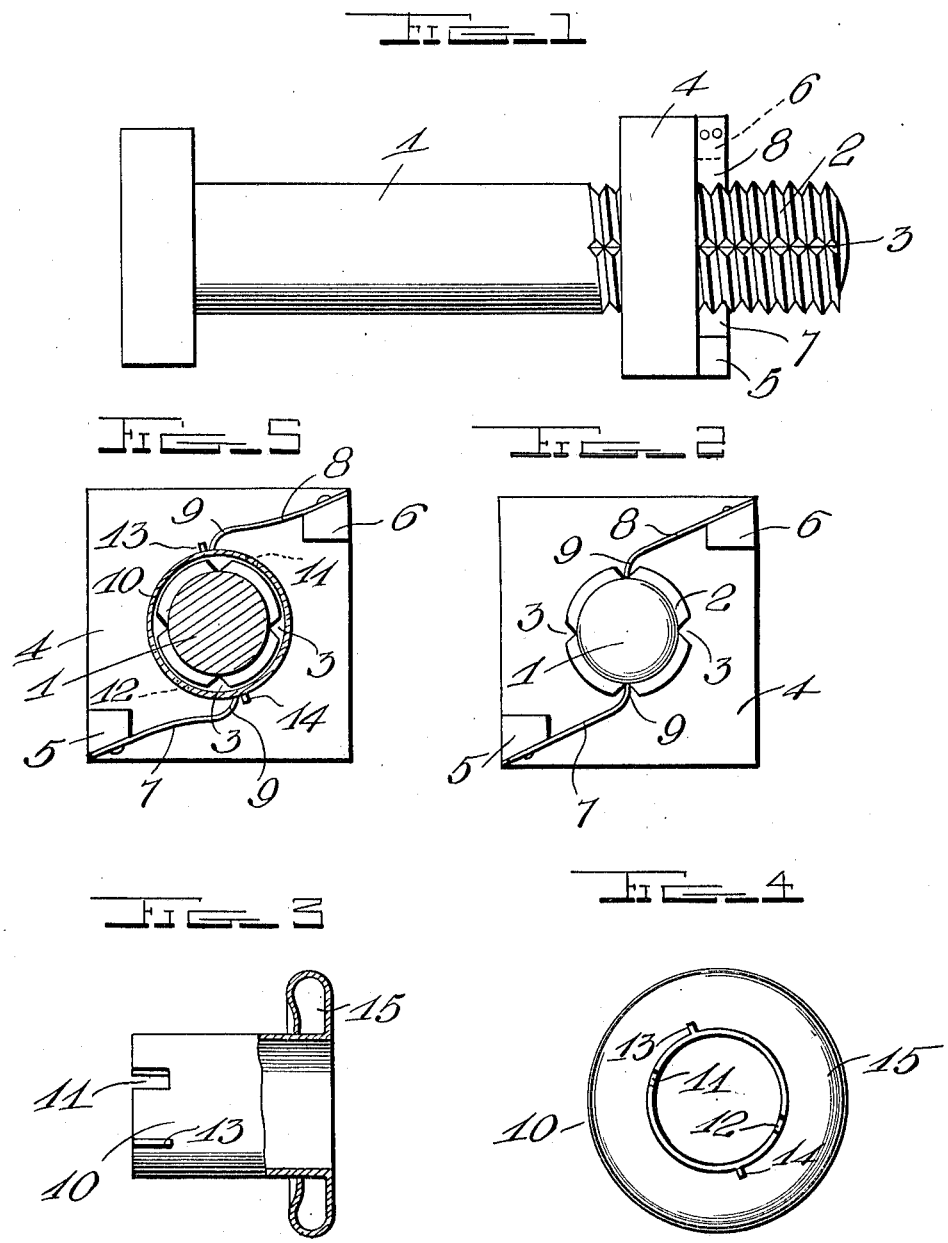

ARLINGTON HORACE J. MILLER, OF BANGOR, PENNSYLVANIA.

NUT-LOCK AND RELEASING DEVICE THEREFOR.

1,019,686.  Specification of Letters Patent.  Patented Mar. 5, 1912.

Application filed February 24, 1910. Serial No. 545,660.

*To all whom it may concern:*

Be it known that I, ARLINGTON HORACE J. MILLER, a citizen of the United States, residing at Bangor, in the county of Northampton and State of Pennsylvania, have invented certain new and useful Improvements in Nut-Locks and Releasing Devices Therefor; and I do declare the following to be a full, clear, and exact description of the invention, such as will enable others skilled in the art to which it appertains to make and use the same.

This invention relates to improved means for releasing a nut lock.

The object of the invention is to provide a simply constructed and efficient device for releasing the spring pawls which fasten a nut to a bolt, and further one that can be also employed for properly deflecting or bending the engaging ends of the pawls when the latter become shorter by wear.

With the above and other objects in view, the invention consists of certain novel features of construction, combination and arrangement of parts, as will be more fully described and particularly pointed out in the appended claim.

In the accompanying drawings, Figure 1 is a side elevation of a nut lock to which this improved releasing device is adapted to be applied. Fig. 2 is an end view of a bolt with a nut applied thereto. Fig. 3 is a side elevation partly in section of this improved releasing device. Fig. 4 is an end view of the releasing device. Fig 5 is a transverse section of a bolt and nut showing this improved device applied.

In the embodiment illustrated, a bolt 1 is shown provided with the usual screw threads 2 having longitudinally extending grooves as 3 formed therein. A nut 4 provided with the usual screw threaded bore for engaging the threads of the bolt is provided on its outer face with two diagonally disposed longitudinally extending lugs 5 and 6 for a purpose to be described. Two spring pawls 7 and 8 are secured at one end to one side of said lugs 5 and 6 with their free ends 9 arranged to engage the grooves 3 in the bolt 1 when the nut is applied. These pawls are secured to oppositely disposed faces of the lugs 5 and 6 with their free ends adapted to engage the grooves in the bolt in such a manner as to permit the nut to be turned in one direction and to lock it against turning in the opposite direction. When it is desired to remove the nut from the bolt, it is necessary that these pawls 7 and 8 be disengaged from the grooves in the bolt and for this purpose, applicant's especially constructed releasing device 10 is provided. This nut releasing device 10 preferably comprises a tubular member having oppositely disposed slits 11 and 12, extending inwardly from one end thereof which are adapted to engage the pawls 7 and 8 when the member 10 has been slipped over the projecting end of the bolt and on the turning of said member 10, the pawls will be forced out of engagement with the grooves in the bolt. This member 10 is also provided on its outer face near said slits 11 and 12 with two longitudinally extending stop ribs 13 and 14, which are adapted to engage the free ends of the pawls after they are released from the grooves in the bolt to hold them out of engagement with said grooves and permit the nut to be unscrewed from the bolt. This member 10 is preferably provided with a handle member 15 to facilitate the operation thereof. It will be clearly obvious that the tubular member 10 can also be practically employed for bending the free engaging ends of the spring pawls by turning said member in an opposite direction after the said pawls have been released from the grooves in the bolt, in which operation the lugs 13 and 14 projecting from the periphery of the member and arranged in a line with the slots 11 and 12, will be brought into contact with said ends of the pawls and a sufficient force applied to accomplish the desired result.

From the foregoing description taken in connection with the accompanying drawings, the construction and operation of the invention will be readily understood without requiring a more extended explanation.

I claim as my invention:—

The combination with a screw threaded bolt having longitudinal grooves in its threads and a nut carrying oppositely arranged spring pawls to engage said grooves, of a cylindrical pawl releasing tube formed at one end with longitudinally disposed slits extending inwardly from said end and arranged at opposite points to receive said spring pawls, for releasing the latter when the tube is turned in one direction, radially projecting and longitudinally extending engaging ribs formed on the outer surface of said tube adjacent said slits and adapted to be engaged with the free ends of said spring pawls, whereby the bolt engaged ends of the pawls are adapted to be bent when the tube is turned in the opposite direction and a handle formed on the opposite end of said tube.

In testimony whereof I have hereunto set my hand in presence of two subscribing witnesses.

ARLINGTON HORACE J. MILLER.

Witnesses:
EMERY H. RUTT,
FLOYD J. RUTT.

Copies of this patent may be obtained for five cents each, by addressing the "Commissioner of Patents, Washington, D. C."